Dec. 29, 1925.

L. W. SERRELL

ELECTRIC HEATER

Filed July 25, 1925

1,567,870

INVENTOR
Lemuel W. Serrell
BY Serrell+Son
his ATTORNEYS.

Patented Dec. 29, 1925.

1,567,870

UNITED STATES PATENT OFFICE.

LEMUEL W. SERRELL, OF NEW YORK, N. Y.

ELECTRIC HEATER.

Application filed July 25, 1925. Serial No. 45,982.

*To all whom it may concern:*

Be it known that I, LEMUEL W. SERRELL, a citizen of the United States, residing at the borough of Manhattan, in the city, county, and State of New York, have invented a new and useful Improvement in Electric Heaters, of which the following is a specification.

My invention relates more particularly to that character of electric heaters known as electric stoves adapted for the heating and cooking of articles by direct contact of the cooking vessel with a flat heating surface.

In heaters of this character heretofore made, exposed heating elements have usually been held in supports made of fire clay or similar material, or the heating elements cast into iron hot plates. These devices require much time to heat up, the heat is not concentrated as in a gas burner, the life of the exposed elements is shortened by liquids boiling over, and frequently reservicing is required particularly when chocolate, molasses or similar materials boil over.

The object of my present invention is to overcome these difficulties, and to provide an electric heater that is practically indestructible; that releases its heat on the bottom of the cooking vessel; and yet allows the heat to mushroom out under the bottom of the vessel, when large utensils are used; that provides a quick means of cleaning and servicing. A device that may be used as part of a range, or used as a separate unit with small legs as an electric table stove.

To accomplish these results I employ a flat protected heating element supported centrally in a grate, the surface of the heating element being flush with the upper surface of the ribs of the grate. Below the heating element, I place a parabolic reflector, having a central hole for drainage, this reflector may be fastened to the under side of the grate in any convenient manner, the reflector is of a larger diameter than the annular heating element and its upper rim is always kept below the upper surface of the ribs forming the grate so as not to interfere with the radial outward passage of the heated air. In forming the grate I prefer to use radial ribs upon the upper surface of which the pot or vessel can rest, these ribs are tied together with cross members, the upper face of which is about a quarter of an inch below the upper face of the radial ribs, this leaves an open throatway so that when a large pot is placed upon the grate the heated air is free to circulate, mushroom fashion, outwardly under the lower surface of the pot or vessel, thus adding to the efficiency of the cooking while the circulation of the air keeps the heating element from overheating.

This air circulation is further enhanced by the drainage hole in the bottom of the reflector and also by placing the rim of the reflector below the grate surface, thus allowing the free outward circulation of the heated air. The heating element, grate and reflector form a self contained unit, together with contacts that make circuit connections hereinafter referred to.

Below the grate I employ a concave depression or bowl into which anything which boils over can drain. This may form part of the range surface or may be a separate unit to which legs may be attached to form a table stove.

The grate is so designed as to be quickly detachable, or it can be swung upwardly for the purpose of cleaning or servicing, all without interference from the circuit connections. To accomplish this the grate is provided with hooked arms that engage a pin on a separate casting which is fastened to the surface of the range where the grate is employed and holds in place a porcelain block to which the permanent circuit is connected, the porcelain block having terminals, with which the terminals on the grate make contact when the grate is in a horizontal position. The arms on the grate are provided with a stop so placed that when the grate is raised beyond a vertical position, the stop engages its support and holds the grate in said position, by bodily lifting the grate however, this stop disengages, and the entire grate unit may be lifted free and removed.

In the accompanying drawings:—

Similar reference characters denote like parts in all the views.

Figure 1:
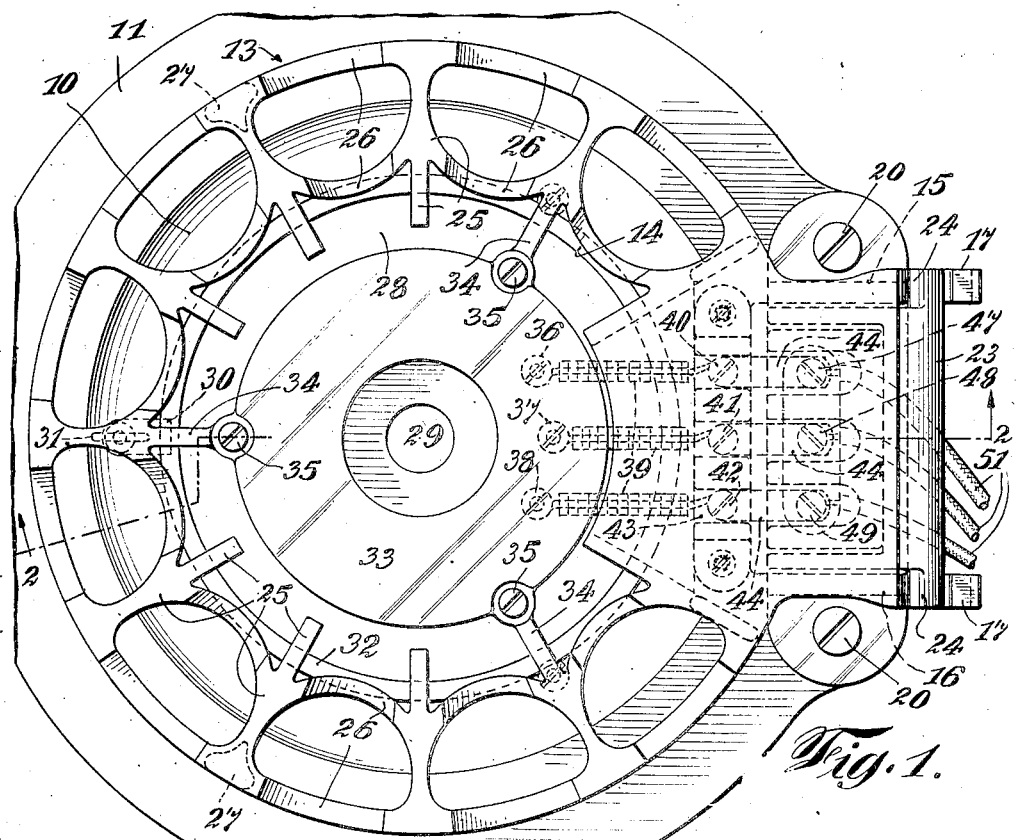
Figure 1 is a top plan view of my improved electric heater.
Figure 2:
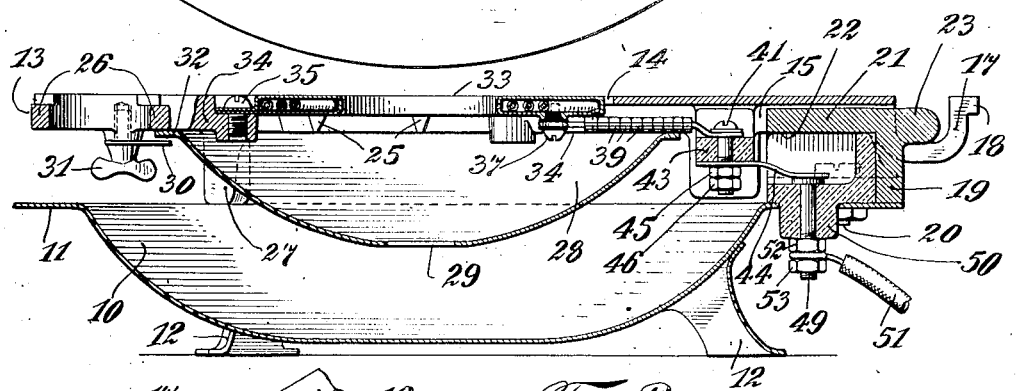
Fig. 2 is a section on the broken line 2—2 of Fig. 1.
Figure 3:
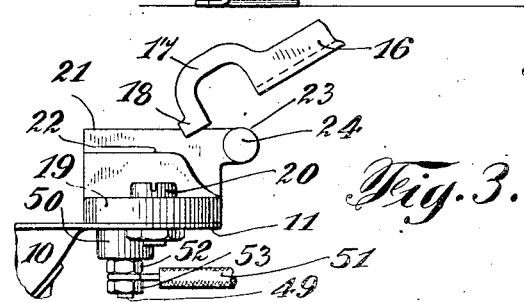
Fig. 3 is a fragmental view illustrating the removable connection of the grate with the bracket.

Referring to the drawing, 10 indicates a metallic bowl, provided with a horizontal annular flange 11, at its top, which flange is adapted to seat upon the top of an electric oven or range surrounding an opening therein, into which the bowl is thus hung.

It may at times be desired to employ my improved heater independently of the range, and for this purpose I may provide the bowl 10, with legs 12, so that it may be stood upon a table or other convenient support.

The grate 13 is preferably circular, and provided with a central opening 14, also preferably of circular form.

At one side of the grate there are two spaced horizontal arms 15 and 16 extending parallel with each other a predetermined distance. These arms are preferably integral with the grate, but may be made separately, and secured to the grate in any suitable manner. The free end of each of these arms terminates in a hook 17 positioned a predetermined distance below the under surface of the grate, and each have a lug 18 projecting from their outer surface.

A bracket 19 extends transversely of the grate below the arms 15 and 16, which bracket is secured to the flange 11 of the receptacle or bowl 10 by screws, rivets or bolts 20, or in any other suitable manner.

The bracket 19 has a raised center 21, with flat top ends and sides, and is at its top of a length to fit between the spaced arms 15 and 16.

Each end of the center portion 21 is cut away transversely at a certain distance from its top forming a seat 22, at each end for the under surfaces of the arms 15 and 16, when the grate is in a normal position and forming supports for the same at this point. The rear ends of these seats 22 are curved outwardly and downwardly forming guides for the hooks 17.

Secured to or made integral with the center piece 21 of the bracket on its outer surface at the top and extending longitudinally thereof, is a cross bar 23, having a rounded hub 24, at each end projecting beyond the ends of the piece 21. The outer surface of this bar 23 is also rounded.

In connecting the grate with the bracket, the grate is turned bottom upward, and the ends of the hooks 17 inserted between the hubs 24 and the curved ends of the seats 22. The grate may now be swung over into a normal position as the hooks will be guided into a position where the hubs 24 will be received by the hooks in the nature of hinge pins. It will readily be understood that the grate may be readily disconnected from the bracket in the same manner, but that when it is desired that the grate be held in a vertical, or nearly vertical position, without disconnecting it from the bracket the lugs 18 on the hooks 17 can be brought against the rear lower edge of the bracket, which acts as a stop against the further backward movement of the grate and holds it in the desired position.

The grate is provided with radial ribs 25 upon the upper surfaces of which the vessel containing the article to be heated or cooked rests. These ribs are tied together by cross members 26, the upper faces of which are about a quarter of an inch below the upper faces of the ribs 25, leaving a space or open throatway whereby when a large pot or cooking vessel is placed upon the grate the heated air is free to circulate and spread outwardly under the lower surface of the vessel, thus adding to the efficiency of the cooking while the circulation of the air keeps the heating element from overheating.

The grate is provided with one or more legs 27, which when the grate is in a normal position for use, rest upon the top of the flange 11 of the bowl 10, and hold the grate at the desired distance above the bowl, and in a true horizontal position.

28 indicates a parabolic reflector, having an opening 29, in its bottom for drainage into the bowl 10.

This reflector is of a larger diameter than the central opening in the grate, and is positioned below the grate in such manner that its upper rim is always below the upper surfaces of the ribs of the grate, and will not therefore interfere with the radial outward passage of the heated air. The reflector may be supported in the proper position by any suitable means, but I prefer to employ spaced buttons 30, on thumb screws 31, which screw into threaded recesses in under side of the grate, the buttons being turned under the rim 32 of the reflector after it has been placed in position.

The heating element 33 preferably comprises a number of conductor wires, arranged in zig-zag form between two flat metallic plates, with a central opening; these plates may be connected by upsetting the edges of one over the other.

This casing for the conductors is preferably round to fit within the central opening in the grate, in such manner that its upper surface is flush with the upper surface of the ribs 25 of the grate. This heating element may be supported within the central opening in the grate in any suitable way, but I prefer to employ three arms 34 secured at one end to the grate and projecting inwardly therefrom having a screw 35, in their free ends, the outer edge of the casing of the heating element being nicked at spaced intervals into which the screws 35 are inserted.

The ends of the conductor wires within the casing are connected to the binding posts 36, 37 and 38, at one side of the casing of the heating element on its underside, and extend therefrom through a covering 39 of insulating material, (which may be in sections to render it flexible) to binding posts 40, 41 and 42, which pass through a block of insulating material 43, supported underneath the grate.

Metallic spring tongues 44 are connected to the binding posts 40, 41 and 42 and are clamped against the under surface of the block 43 by nuts 45 and 46, the free ends of these spring tongues come into contact with the flat heads of metallic bolts 47, 48 and 49 when the grate is in the horizontal position for use. These bolts 47, 48 and 49 pass through holes in a block 50 of insulating material, supported in the bracket 19. The permanent circuit wires 51 are connected to the lower ends of the bolts 47, 48 and 49, and are clamped in place by nuts 52 and 53.

It will thus be seen that when the grate is in the horizontal position the electric current passes through the heating element, and that when the grate is lifted the spring tongues 44 pass off the heads of the bolts 47, 48 and 49, breaking the circuit.

The hubs 24 have sufficient play within the hooks 17 to allow the grate to be quickly detachable when desired, and the weight of the grate when raised will drop the lugs 18 into contact with the base of the bracket 19, and support the grate in a vertical or nearly vertical position when it is not desired to remove it from the bracket, but by lifting the grate when in such position the lugs will pass from contact with the bracket base, and the grate may then be readily detached.

The radial ribs 25 of the grate, upon the upper surfaces of which the vessel containing the articles to be heated or cooked is seated, being spaced above the upper surfaces of the tie members 26, provides open passageways between said ribs for the unobstructed outward spread of the heated air under the cooking vessel, adding materially to the efficiency of the cooking, while the circulation of the air keeps the heating element from overheating.

I claim as my invention:

1. An electric heater comprising a grate having an opening, a hinged support for the grate with which it is detachably connected, and a protected heating element within said opening in the grate.

2. An electric heater comprising a grate having an opening, a hinged support for the grate with which it is detachably connected, a protected heating element within said opening in the grate, and a concave reflector detachably secured to the grate below the heating element.

3. An electric heater comprising a grate having an opening, a hinged support for the grate with which it is detachably connected, a protected heating element within said opening in the grate, a concave reflector having an opening in its bottom, and a bowl supported below said reflector.

4. An electric heater comprising a grate having a central opening, a heating element, a flat housing for the same insulated therefrom and provided with a central opening, said housing fitting within said opening in the grate, means for supporting the same, and a support on one side of the grate permitting the grate to be swung upwardly and detached.

5. An electric heater comprising a grate having a central opening, a heating element, a flat housing for the same insulated therefrom and provided with a central opening, said housing fitting within said opening in the grate, means for supporting the same, a support on one side of the grate permitting the grate to be swung upwardly, stop members for holding the grate in a raised position, and means by which the grate may be released from said stop members and detached from said support.

6. An electric heater comprising a grate having an opening, arms projecting from one side of the grate provided with hooks at their free ends, a bracket, a support for the same, hubs at each end of said bracket engaging said hooks, a protected heating element within said opening in the grate, a block of insulating material with which the permanent circuit is connected, a support for the same, electrical connections and contacts between said heating element and the permanent circuit, said grate being detachably pivoted to said bracket by means of said hooks and hubs whereby it may be swung into a vertical position, the electric circuit being broken when the grate is swung upwardly and restored upon the return of the grate to a horizontal position.

7. An electric heater comprising a grate having a central opening, two spaced parallel arms projecting therefrom on one side and provided with hooks at their free ends, a bracket, a support for the same, hubs at each end of such bracket detachably engaging said hooks, a concave reflector detachably secured to the grate below the heating element provided with an opening in its bottom, and a bowl supported below said reflector.

8. An electric heater comprising a grate having an opening and spaced radial ribs, connecting members between said ribs, the upper surfaces of which are spaced a predetermined distance below the upper surface of said ribs leaving open passageways between the ribs for the free outward spread of heated air, a hinged support for the grate with which it is detachably connected, and a protected heating element within said opening in the grate.

9. An electric heater comprising a grate having an opening and spaced radial ribs, connecting members between said ribs, the upper surfaces of which are spaced a predetermined distance below the upper surfaces of said ribs leaving open passageways between the ribs for the free outward spread of heated air, a hinged support for the grate with which it is detachably connected, a protected heating element within said opening in the grate, and a concave reflector detachably secured to the grate below the heating element.

10. An electric heater comprising a grate having an opening and spaced radial ribs, connecting members between said ribs, the upper surfaces of which are spaced a predetermined distance below the upper surfaces of said ribs leaving open passageways between the ribs for the free outward spread of heated air, a hinged support for the grate with which it is detachably connected, a protected heating element within said opening in the grate, a concave reflector having an opening in its bottom, and a bowl supported below said reflector.

11. An electric heater comprising a grate having a central opening and spaced radial ribs, connecting members between said ribs, the upper surfaces of which are spaced a predetermined distance below the upper surfaces of said ribs leaving open passageways between the ribs for the free outward spread of heated air, a heating element, a flat housing for the same insulated therefrom and provided with a central opening, said housing fitting within said opening in the grate, means for supporting the same, and a support on one side of the grate permitting the grate to be swung upwardly and detached.

12. An electric heater comprising a grate having a central opening and spaced radial ribs, connecting members between said ribs, the upper surfaces of which are spaced a predetermined distance below the upper surfaces of said ribs leaving open passageways between the ribs for the free outward spread of heated air, a heating element, a flat housing for the same insulated therefrom and provided with a central opening, said housing fitting within said opening in the grate, means for supporting the same, a support on one side of the grate permitting the grate to be swung upwardly, stop members for holding the grate in a raised position, and means by which the grate may be released from said stop members and detached from said support.

Signed by me this 16th day of July 1925.

LEMUEL W. SERRELL.